United States Patent [19]

Bell

[11] 4,152,278

[45] May 1, 1979

[54] WAX ESTERS OF VEGETABLE OIL FATTY ACIDS USEFUL AS LUBRICANTS

[75] Inventor: Edward W. Bell, Peoria, Ill.

[73] Assignee: The United States of America as represented by the Secretary of Agriculture, Washington, D.C.

[21] Appl. No.: 907,473

[22] Filed: May 19, 1978

[51] Int. Cl.[2] .................... C10M 1/26; C10M 1/38; C08H 3/00

[52] U.S. Cl. .................... 252/56 S; 252/48.6; 260/399

[58] Field of Search .................... 252/48.6, 56 S; 260/399

[56] References Cited

U.S. PATENT DOCUMENTS

| | | | |
|---|---|---|---|
| 2,757,139 | 7/1956 | Matuszak et al. | 252/56 S |
| 3,130,159 | 4/1964 | Stedt | 252/56 S X |
| 3,526,596 | 9/1970 | Kress et al. | 252/56 S X |
| 3,620,290 | 11/1971 | Kress et al. | 252/56 S X |
| 3,915,872 | 10/1974 | Sturwold et al. | 252/56 S X |
| 4,031,019 | 6/1977 | Bell | 252/56 S |
| 4,067,817 | 1/1978 | Sturwold | 252/56 S X |

OTHER PUBLICATIONS

Bell et al., CA 78:73910s (1973).
Bell et al., CA 85:163038n (1976).
Perlstein et al., JAOCS 51:335–339 (1974).
Bell et al., JAOCS 54 (6):259–263 (1977).

*Primary Examiner*—Thomas Waltz
*Attorney, Agent, or Firm*—M. Howard Silverstein; David G. McConnell; Curtis P. Ribando

[57] ABSTRACT

Wax esters are prepared entirely from acids obtained from hydrogenated vegetable oils. Fatty alcohols, prepared by hydrogenolysis of the fatty acids, are esterified with the fatty acids to yield the wax esters. These esters have properties similar to those of sperm whale oil and are useful as lubricant compositions. The sulfurized wax esters are useful as extreme pressure lubricant additives.

9 Claims, No Drawings

WAX ESTERS OF VEGETABLE OIL FATTY ACIDS USEFUL AS LUBRICANTS

BACKGROUND OF THE INVENTION

1. Field of the Invention

This invention relates to the preparation of novel wax ester compounds wherein both the fatty acid and fatty alcohol moieties are vegetable oil derivatives. The compounds are useful lubricants and are particularly advantageous in the continuous casting of steel. They can also be sulfurized to yield extreme pressure and antiwear lubricant additives.

2. Description of the Prior Art

The continuous casting of steel is considered as one of the major technological advances in the steel industry in recent years. In conventional steelmaking, up to 30% of the steel poured is lost in ingot trimming and mill scale; continuous casting cuts these losses down to 10% or less. Continuous casting produces billets and slabs with no ingot pouring and reheating before rolling—processes required in the handling of blooms. Because of economic advantages there has been a continuous growth in this new steelmaking method. The capacity for continuous casting of steel in this country is about 40 million tons per year. Domestic steelmakers express the belief that eventually about half their production will roll off a continuous line. Based on the use of 4–6 ounces of lubricant per ton, a substantial market for lubricants for continuous casting of steel is developing.

The most important function of a mold lubricant is to prevent sticking. Without continuous and reliable lubrication of the mold walls, the steelmaking process slows down or stops. The most widely used lubricants to date have been rapeseed oil high in erucic acid and a blend of rapeseed oil with a more viscous mineral oil. Blown rapeseed is selected primarily because it does not penetrate into the surface of the steel. Crambe, another high erucic oil, in plant-scale tests by the steel industry, proved superior to rapeseed oil in continuous casting of steel. Other oils tried as lubricants are silicone, fish and mineral, as well as paraffin wax, inorganic salts, and mixtures of fatty acids and graphite [W. G. Ritter, Iron Steel Eng., Feb. 1967, pp. 113–118; and Nieschlag et al., JAOCS 48: 723–727 (1971)]. Mixtures of dimer and trimer of unsaturated fatty acids, a glyceride oil, and a mineral lubricating oil have also been reported, U.S. Pat. No. 3,640,860.

The properties which make the above compositions useful as lubricants in the continuous casting of steels are:

1. A viscosity of at least about 100 SUS at 100° F.;
2. A high flash point, at least about 500° F. for forging grade steel;
3. A high fire point; and
4. A smoke point that is sufficiently high as to permit the steel mold interface to be visually observed.

U.S. Pat. Nos. 2,757,139, 3,130,159, 3,526,596, 3,620,290, and 3,915,872 disclose lubricant compositions comprising esters of fatty acids and alcohols. Most of these alcohols are derived from nonrenewable petrochemical sources and are in diminishing supply. Moreover, the compositions prepared therefrom have metal-casting lubricating properties inferior to rapeseed and crambe oils.

Also in the field of lubrication, there exists a need for synthetic extreme pressure (EP) and antiwear (AW) lubricant additives as replacements for the conventionally used sulfurized sperm oil (SSO). Extreme pressure additives prevent destructive metal-to-metal contact in lubrication at high pressure and/or temperature such as that found in certain gear elements in automotive vehicles and various industrial machines where high pressure can cause a film of lubricant to rupture. EP/AW lubricants should have good lubricity, good cooling properties, high film strength, good load bearing ability, and miscibility with the usual types of base oils. SSO satisfies these requirements and has been used extensively in EP/AW additives. However, in 1970, the United States placed the sperm whale on the endangered species list, and in 1971, banned the import of its products.

In U.S. Pat. No. 4,031,019, which is herein incorporated by reference, I disclose a class of lubricant alcohol esters prepared from free fatty acid mixtures obtained from selectively and partially hydrogenated soybean and linseed oils. These esters were characterized by lubricant properties superior to the prior art lubricants previously mentioned, and their sulfurized derivatives were shown to be at least comparable to SSO as EP/AW additives. The primary disadvantage of these esters is that the saturated alcohols used in their preparation are derived mostly from petrochemicals.

A preliminary attempt to synthesize wax esters from certain natural animal and vegetable oils for use as possible sperm oil replacements was disclosed in Perlstein et al., JAOCS 51: 335-339 (Aug. 1974). The somewhat complicated method involved a Bouveault-Blanc reduction of triglycerides to sodium alkoxides which were decomposed with urea and then esterified with the triglycerides. The properties of the products were never reported and the compositions have not attained the status of sperm oil replacements.

SUMMARY OF THE INVENTION

I have now surprisingly found an effective lubricant composition comprising a mixture of wax ester compounds which can be easily derived entirely from renewable vegetable oil sources. This composition is prepared from a free fatty acid mixture wherein the fatty acids are characterized by the structural formula:

$$RCO_2H$$

where R is a radical selected from the group of:

(1) $CH_3(CH_2)_xCH{=}CH(CH_2)_yCH{=}CH(CH_2)_z$—
where $x=1$–4, $y=1$–4, $z=7$–8, and $x+y+z=12$;

(2) $CH_3(CH_2)_xCH{=}CH(CH_2)_y$—
where $x=0$–9, $y=5$–14, and i x+14;

(3) $CH_2{=}CH(CH_2)_{15}$—;

(4) $CH_3(CH_2)_{16}$—; and (5) $CH_3(CH_2)_{14}$—;

where the distribution of the radicals in the fatty acid mixture includes from a trace to about 50 mole percent of radical (1), from about 35 to about 80 mole percent of radicals (2) and (3) combined, from about 3 to about 20 mole percent of radical (4), and from about 5 to about 15 mole percent of radical (5), and where the distribution of radicals in the mixture also contains from a trace to about 60 mole percent of isolated trans double bonds, from 0 to about 16 mole percent of conjugatable double bonds, and from a trace to about 45 mole percent of nonconjugatable double bonds.

The process of preparation comprises the following steps:

(a) selectively reducing a first portion of the fatty acid mixture to substantially the corresponding alcohols;

(b) esterifying a second portion of the fatty acid mixture with the alcohols obtained in step (a) in order to yield wax esters having the structural formula:

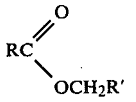

where both R and R′ are radicals independently selected from the group of radicals set forth above; and (c) recovering the wax esters for use as the lubricant composition.

I have also found that the sulfurized derivatives of these novel compounds are comparable to SSO as EP/AW additives.

In accordance with these findings, it is therefore an object of this invention to prepare lubricant compositions and EP/AW additives having the physical properties described above.

It is also an object of the invention to prepare the novel lubricant compositions entirely from renewable agricultural resources.

Another object of the invention is to prepare replacements for sperm whale oil and substitutes for sulfurized sperm whale oil.

Other objects and advantages of this invention will become readily apparent from the ensuing description.

DETAILED DESCRIPTION OF THE INVENTION

Suitable starting materials for use in the preparation of the wax ester compositions of the invention include free fatty acid mixtures which contain essentially no linolenic acid or isomers of linolenic acid, but do contain from a trace to about 50 mole percent of isolinoleic acid [i.e., $CH_3(CH_2)_xCH{=}CH(CH_2)_yCH{=}CH(CH_2)_zCO_2H$, where $x=1$–$4$, $y=1$–$4$, $z=7$–$8$, $x+y+2=12$], from about 35 to about 80 mole percent of isooleic acid [i.e., $CH_3(CH_2)_xCH{=}CH(CH_2)_yCO_2H$ or $CH_2{=}CH(CH_2)_{15}CO_2H$, where $x=0$–$9$, $y=5$–$14$, and $x+y=14$], from about 3 to about 20 mole percent of stearic acid, from about 5 to about 15 mole percent of palmitic acid, from a trace to about 60 mole percent of isolated trans double bonds, from about 0 to about 16 mole percent of conjugatable double bonds, and from a trace to about 45 mole percent of nonconjugatable double bonds. These mixtures are most readily obtained by saponification of soybean oil which was partially hydrogenated with a nickel catalyst, or by saponification of soybean oil or linseed oil which was selectively hydrogenated with a copper-on-silica catalyst. The high-pressre hydrogenations which yield these fatty acid mixtures are typically conducted at about 170° C. and 600 p.s.i. for about 7.5 hours as described in detail in U.S. Pat. No. 4,031,019, supra. Of course, it is understood that fatty acid mixtures from other sources could also be used as long as they have the acid distribution described above.

Hydrogenolysis of the fatty acid mixture is preferably conducted with a catalyst and under conditions which will not substantially alter the geometric and positional isomer distribution of the starting mixture. This can be accomplished at temperatures of about 250°–350° C. and pressures of about 2500–3000 p.s.i. for about 3–10 hours. An effective catalyst for this purpose is a CuO-CdO catalyst such as "Girdler T-1057" (ca. 40.8% CuO, 19.7% CdO, and 14.3% $Cr_2O_3$). For a typical hydrogenolysis, an autoclave is charged with the fatty acid mixture and 1-10 g. of catalyst per 100 ml. of acids. After the vessel is purged with nitrogen or other inert gas, it is pressurized with hydrogen at room temperature to the level desired for the reaction. The charge is then heated with stirring, and the original hydrogen pressure is maintained until the hydrogen uptake ceases. After cooling the autoclave, the fatty alcohols are recovered by filtration. A certain amount of esterification of the fatty alcohols and fatty acids may occur during this step.

Generally, the esterification is conducted by adding approximately a stoichiometric amount of fresh fatty acid mixture to the fatty alcohols recovered from the hydrogenolysis. Though it is not necessary, it is preferred that the added fatty acid mixture have the same composition as that from which the alcohols were derived. Alternatively, the hydrogenolysis can be terminated when about 50% of the acids are reduced to alcohols, and the resulting mixture can than be esterified. Of course, if there is a stoichiometric imbalance after the hydrogenolysis, the deficient component can be supplemented prior to esterification. As with the hydrogenolysis, any catalyst may be used which will not substantially alter the geometric and positional isomer distribution of the alcohol and acid moieties. One such suitable catalyst is the combination of calcium acetate and barium acetate in a 3:1 ratio. It is also possible to conduct the esterification without a catalyst if refluxed for a sufficient duration. The reactants and catalyst are refluxed in an organic solvent such as xylene until completion of the esterification. In order for the reaction to proceed beyond equilibrium, it is necessary that the water of esterification be removed. By collecting it in a distillation trap, and calculating the theoretical amount of water, the end of the reaction can be determined. The resultant wax esters are recovered by washing the reaction mixture with water, drying, and stripping off the remaining solvent.

These esters may be sulfurized according to any conventional procedure. In a typical sulfurization, they are mixed with about 5–25% elemental sulfur, preferably about 12% sulfur, by weight of the esters, and are heated slowly to about 250° F. under reduced pressure and with constant agitation. After about 0.5 hour, the mixture is heated to about 360° F. for about 4 hours with constant stirring. The sample is then cooled to 200° F. and blown free of $H_2S$ and other sulfur-containing species by drawing air through it.

The following examples are intended only to further illustrate the invention and are not intended to limit the scope of the invention which is defined by the claims.

EXAMPLE 1

Step A.

Hydrogenation

A 6-gallon autoclave was charged with 4.3 liters of commercially refined and bleached soybean oil (10.7%, C16.0; 3.6%, C18.0; 25.2%, C18:1; 53.2%, C18:2; and 7.5%, C18:3) and 10 g. of heat-activated copper-on-silica gel catalyst (calcined at 350° C. for 2.5 hours). After the vessel was purged with nitrogen and pressurized with hydrogen to 500 p.s.i. at room temperature, the charge was heated with stirring to 170° C. Hydrogen pressure was then maintained at 600 p.s.i. for 7.5 hours. Progress of the hydrogenation was followed by sampling periodically and determining the refractive indices of filtered oil samples. When the desired refractive index was reached, the autoclave was cooled to 80° C. and the selectively hydrogenated soybean oil was filtered with filter aid.

The hydrogenated oil was saponified to the corresponding free fatty acids by refluxing it for 1 hour with twice the volume of a 20% ethanolic solution of KOH. After cooling, the reaction mixture was acidified with dilute (50%) HCl. The free fatty acids were extracted with petroleum ether and washed neutral with distilled water. The petroleum ether solution was then dried over anhydrous $Na_2SO_4$, filtered, and the solvent was removed from the acids in a rotary vacuum evaporator. Analysis of the recovered product is given in Table I.

Step B

Hydrogenolysis

A 1000-ml. stainless-steel Magne-Dash autoclave was charged with 600 ml. of the selectively hydrogenated soybean acids prepared in Step A and 30 g. of "Girdler T-1057" catalyst (Chemetron Corporation, Louisville, Ky., ca. 40.8% CuO, 19.7% CdO, and 14.3% $Cr_2O_3$). After the vessel was purged with nitrogen and pressurized with hydrogen to 3000 p.s.i. at room temperature, the charge was heated with stirring to 300° C. Hydrogen pressure was then maintained at 3000 p.s.i. for 5 hours. At this stage, hydrogen uptake was nil over a period of 0.25 hour. After cooling the autoclave to 80° C., the batch was filtered with filter aid and the fatty alcohol product was analyzed. The results are shown in Table I.

Step C

Esterification 472.3 Grams (1.74 mole) of the fatty alcohols prepared in Step B and 446 g. (1.67 mole) of the precursory fatty acids prepared in Step A were refluxed in 100 ml. of xylene in the presence of 2 g. of a catalyst consisting of three parts by weight of calcium acetate and one part of barium acetate. The theoretical amount of water of esterification was removed by a Bitwell-Sterling Tube. The resultant wax ester of selectively hydrogenated soybean oil (WESHSBA) was washed with water, dried, and stripped of solvent. Infrared analysis showed that there was no free hydroxyl present. The acid value was 1.2. Further analysis is given in Table I.

EXAMPLE 2

Step A

Hydrogenation

A 3-gallon autoclave was charged with 6 liters of refined and bleached linseed oil (A.D.M. Superb; 6.7%, C16:0; 3.7%, C18:0; 23%, C18:1; 15.6%, C?18:2; and 51%, C18:3) and 60 g. of heat-activated copper-on-silica gel catalyst (calcined at 350° C. for 2.5 hours). After the vessel was purged with nitrogen and pressurized with hydrogen to 400 p.s.i. at room temperature, the charge was heated to 170° C. Hydrogen pressure was then maintained at 600 p.s.i. until the hydrogen uptake was nil over a period of 0.25 hour. The reaction mixture was recovered by adding 50 g. of filter aid ("Super Filtrol"), heating to 85° C., and filtering under vacuum over a layer of "Celite."

The hydrogenated oil was saponified to the corresponding free fatty acids by the same procedure used in Example 1. Analysis of the recovered product is given in Table I.

Step B

Hydrogenolysis

Sample 1: A 1000 -ml. stainless-steel Magne-Dash autoclave was charged with 600 ml. of the selectively hydrogenated linseed acids prepared in Step A and 6 g. of the "Girdler T-1057" catalyst used in Example 1. After the vessel was purged with nitrogen and pressurized with hydrogen to 2500 p.s.i. at room temperature, the charge was heated with stirring to 300° C. Hydrogen pressure was then maintained at 2500 p.s.i. for 4.5 hours. The reaction mixture was taken up in hexane, filtered through filter aid ("Super Filtrol") and analyzed. The hydrogenolysis was then continued with 12 g. "T-1057" catalyst at 300° C. and 2500 p.s.i. for 4 hours. The batch was recovered by the same procedure used the first time, and the analysis is shown in Table I.

Sample 2: The above procedure was repeated except that 60 g. of catalyst were used and after reacting at 2500 p.s.i. for 6.75 hours, the hydrogen pressure was increased to 3000 p.s.i. for another 3 hours. The reaction mixture was treated with hexane, decolorizing carbon, and filter aid. The analysis is given in Table I.

Step C

Esterification

545 Grams of Sample 1 (fatty acid-alcohol mixture), 400 g. of Sample 2 (fatty alcohols), and 205 g. of selectively hydrogenated linseed acids prepared in Step A were refluxed overnight with 100 ml. xylene. The theoretical amount of water by esterification was collected in a Bitwell-Sterling Tube. The resultant wax ester of selectively hydrogenated linseed oil (WESHLSA) was washed with water, dried, and stripped of solvent. Infrared analysis showed that there was no free hydroxyl present. The acid value was 2.65. Further analysis is given in Table I.

The physical properties of viscosity, smoke, flash, and fire points were determined for the wax esters prepared in Examples 1 and 2. These were compared to the properties of sperm whale oil and are reported below in Table II. The viscosities were determined in a Cannon-Fenske-Ostwald viscometer at 100° and 210° F. and were converted to Saybolt Universal viscosities (SUS).

EXAMPLE 3

Sulfurization

A sample of the WESHSBA prepared in Example 1 was placed in a 2-liter three-necked flask equipped with an electric heating mantle, a mercury-sealed motor-driven stirrer, and an adapter connected to a vacuum pump. The sample was charged with 12% by weight of elemental sulfur. Then, with constant agitation, the pressure was reduced to 208 mm. and the reaction mixture was heated slowly to 250° F. After about 0.5 hour, the sample was slowly heated to 360°±5° F. After 4 hours of constant stirring, the sample was cooled to 200° F. and blown free of $H_2S$ and other sulfur-containing species by drawing air through it. The sample was blown until entrained air tested negative on lead acetate paper.

EXAMPLE 4

A sample of the WESHLSA prepared in Example 2 was sulfurized by the same procedure employed in Example 3.

Table I

| Example | Product[a] | Free acids as oleic | Conversion acids to alcohols (%) | GLC Analysis C16:0 Alcohols (%) | C16:0 Acids (%) | C18:0 Alcohols (%) | C18:0 Acids (%) | C18:1 Alcohols (%) | C18:1 Acids (%) | C18:2 Alcohols (%) | C18:2 Acids (%) | Conjugatable diene (%) | Non-conjugatable diene (%) | trans isolated (%) | Iodine value | $N_D30$ |
|---|---|---|---|---|---|---|---|---|---|---|---|---|---|---|---|---|
| 1A | SHSBAc | 100 | — | — | 10.2 | — | 4.2 | — | 76.2 | — | 9.4 | 0.2 | 9.2 | 37.3 | 86.2 | — |
| 1B | SHSBAl | 0.23 | 97.9 | 10.6 | 15.0 | 4.9 | 10.5 | 74.3 | 74.5 | 10.2 | — | — | — | 37.5 | 91.4 | 1.4572 |
| 1C | WESHSBA | 0.58 | — | 10.6 | 10.3 | 5.6 | 4.9 | 74.2 | 75.6 | 9.6 | 9.2 | — | — | 40.2 | 92.3 | 1.4612 |
| 2A | SHLSAc | 100 | — | — | 6.2 | — | 4.6 | — | 37.6 | — | 48.0 | 5.0 | 43.0 | 44.4 | 125.7 | — |
| 2B-1 | SHLSAl | 39.6 | 35.0 | 6.5 | 6.2 | 8.7 | 5.3 | 63.2 | 62.2 | 21.5 | 27.3 | — | — | 50.4 | 104.5 | 1.4623 |
| 2B-2 | SHLSAl | 0.0 | 99+ | 7.2 | — | 6.1 | — | 54.9 | — | 31.8 | — | — | — | 54.3 | 113.0 | 1.4593 |
| 2C | WESHLSA | 1.3 | — | 6.9 | 6.9 | 7.3 | 5.1 | 58.6 | 60.6 | 27.1 | 27.6 | — | — | 51.0 | 112.6 | 1.4666 |

[a]SHSBAc = selectively hydrogenated soybean acids. SHSBAl = selectively hydrogenated soybean alcohols. WESHBA = wax esters of selectively hydrogenated soybean acids. SHLSAc = selectively hydrogenated linseed acids. SHLSAl = selectively hydrogenated linseed alcohols. WESHLSA = wax esters of selectively hydrogenated linseed acids.
[b]Calculated difference between total diene determined by GLC analysis and conjugatable diene determined by UV analysis.

Table II

| | | Viscosity SUS[b] (°F.) | | | Points (°F.) | | |
|---|---|---|---|---|---|---|---|
| Wax ester[a] | Iodine value | 100 | 210 | Viscosity index | Smoke | Flash | Fire |
| WESHSBA | 91.4 | 92.4 | 42.0 | 207 | 311 | 482 | 770 |
| WESHLSA | 112.6 | 135.7 | 47.8 | 211 | 320 | 536 | 698 |
| Sperm oil[c] | 82.0 | 109.0 | 44.8 | 223 | 275–325 | 490 | 655–675 |

[a]WESHSBA = esters of selectively hydrogenated soybean acids. WESHLSA = wax esters of selectively hydrogenated linseed acids.
[b]SUS = Saybolt Universal viscosity.
[c]Winterized at 45° F.

The sulfurized wax esters prepared in Examples 3 and 4 were evaluated in base oils used in EP automative and industrial applications. Performance of these esters in base oils including engine crankcase oil (AA), engine transmission base fluid (BB), RGO-100 gear lubricant (CC), (100/100 viscosity) solvent-extracted neutral oil (DD), and "Topaz S105" paraffin oil ("Topaz S105") is compared in Table III to the performance of sulfurized sperm oil (SSO) and two SSO substitutes (Com Sub A and Com Sub B). Most commercial sulfurized replacements are sold as "packages" containing a number of additives, such as viscosity improver, metal deactivator, antioxidants, and EP agents. The sulfurized wax esters of this invention contained no additives nor were they winterized before sulfurization. The sulfurized additives were added to each base oil at 5% or 10% by weight concentration levels. The blended oils were stored for 24 hours at 35° F., 24 hours at room temperature, 24 hours at 35° F., and 1 month at room temperature. All sulfurized materials had good solubilities in all the base oils.

EP, wear, corrosion, viscosity, gravity, emulsion, foam test data, and thermal stability were obtained on all samples. EP tests were made on a Precision Scientific four-ball EP tester (1440 r.p.m.) in which loads were successively increased first in 20- and then 10-kg. increments until an immediate seizure occurred, representing the weld point. Scar diameters were determined with a Precision four-ball wear tester. Samples were run for 1 hour at 400 r.p.m. at 120° C. and under a 50-kg. load with and without additive. After the balls were cleaned with naphtha and hexane, scar diameters were measured under a microscope assembly #73607, with measuring grid (Precision Scientific).

At 5% concentration in "Topaz S105," the wax esters exhibited EP properties better than those of SSO and Com Subs A and B. Values of kinematic viscosity, viscosity indices, and American Petroleum Institute (API) gravities of the wax esters tested as 10% blends in the four base oils are within most industrial and military specifications for lubricants containing EP additives. The emission test data indicates that the wax esters form stable emulsions with the four base oils and are suitable in this regard for marine engine lubrication and cutting oils. In base oils BB and CC, they exhibit excellent deemulsification properties desirable in forced-feed circulating lubrication systems. In the foam test, the sulfurized wax esters show less foaming tendencies than did SSO or Com Sub A and B in base oils AA, CC, and DD. No foaming at all was observed in base oil BB. In the thermal stability test the esters demonstrated their usefulness at operating temperatures up to about 300° F.

Any of the conventionally used lubricant additives could be used in conjunction with the sulfurized wax ester in order to enhance their EP properties or to improve their performance under the operating conditions of the base oil. For example, the thermal stability and copper and lead corrosion tendencies can be improved by including either an appropriate metal deactivator or antioxidant, or both.

It is understood that the foregoing detailed description is given merely by way of illustration and that modification and variations may be made therein without departing from the spirit and scope of the invention.

Table III

Performance Comparison of Sulfurized Wax Esters in Base Oils

| Base oil[a] | Sulfurized additive[b] | Extreme pressure Weld point (kg.) | Wear Average wear scar (mm.) | Copper[c] corrosion | Lead corrosion (mg./in.$^2$) | Kinematic viscosity (centistokes) 100° F. | Kinematic viscosity (centistokes) 210° F. | Viscosity index | API[d] gravity (degree API 60° F.) | Emulsion test (ml.) Oil | Emulsion test (ml.) $H_2O$ | Emulsion test (ml.) Emul | Foam test[e] (ml.) I | Foam test[e] (ml.) II | Foam test[e] (ml.) III |
|---|---|---|---|---|---|---|---|---|---|---|---|---|---|---|---|
| AA | None | 140 | 0.635 | 1B | — | — | — | — | — | — | — | — | — | — | — |
| | 10% WESHSBA | 240 | 0.575 | 3A | 0.2 | 132.42 | 13.57 | 119 | 28.0 | 1 | 4 | 75 | 0–0 | 10–0 | 0–0 |
| | 10% WESHLSA | 260 | 0.550 | 3A | 38.6 | 153.18 | 15.20 | 119 | 27.8 | 1 | 8 | 70 | 0–0 | 20–0 | 0–0 |
| | 10% SSO | 300 | 0.583 | 1A/B | 22.5 | 131.19 | 13.57 | 101 | 27.8 | 1 | 0 | 79 | 0–0 | 40–0 | 0–0 |
| | 10% Com Sub A | 280 | 0.480 | 3A | 30.3 | 134.19 | 13.61 | 111 | 27.6 | 1 | 1 0 | 79 | 45–0 | 30–0 | 0–0 |
| | 10% Com Sub B | 240 | 0.575 | 1A | 3.5 | 127.97 | 13.20 | 113 | 27.7 | 75 | 0 | 79 | 10–0 | 20–0 | 20–0 |
| BB | None | 120 | 0.625 | 1B | — | — | — | — | — | — | — | — | — | — | — |
| | 10% WESHSBA | 240 | 0.675 | 2B | 5.8 | 538.62 | 35.30 | 118 | 25.3 | 21 | 25 | 34 | 0–0 | 0–0 | 0–0 |
| | 10% WESHLSA | 260 | 0.590 | 3B | 25.3 | 643.44 | 41.14 | 112 | 25.1 | 15 | 24 | 41 | 0–0 | 0–0 | 0–0 |
| | 10% SSO | 280 | 0.628 | 1A | 12.7 | 537.80 | 36.02 | 113 | 25.7 | 9 | 24 | 47 | 0–0 | 0–0 | 0–0 |
| | 10% Com Sub A | 320 | 0.653 | 3A | 27.4 | 543.52 | 36.09 | 121 | 25.9 | 5 | 22 | 53 | 0–0 | 0–0 | 0–0 |
| | 10% Com Sub B | 240 | 0.591 | 1B | 4.7 | 549.00 | 35.37 | 103 | 25.7 | 40 | 37 | 3 | 0–0 | 10–0 | 0–0 |
| CC | None | 130 | 0.603 | — | — | — | — | — | — | — | — | — | — | — | — |
| | 10% WESHSBA | 240 | 0.400 | 3A | 36.1 | 250.30 | 21.57 | 112 | 26.1 | 26 | 19 | 35 | 0–0 | 10–0 | 0–0 |
| | 10% WESHLSA | 260 | 0.660 | 3B | 28.6 | 272.59 | 22.77 | 110 | 26.1 | 9 | 9 | 62 | 20–0 | 0–0 | 0–0 |
| | 10% SSO | 260 | 0.642 | 3A | 19.0 | 240.77 | 20.94 | 110 | 26.2 | 8 | 11 | 61 | 510–20 | 150–0 | 180–0 |
| | 10% Com Sub A | 280 | 0.675 | 3B | 31.4 | 244.79 | 20.90 | 113 | 25.9 | 6 | 20 | 54 | 420–0 | 160–0 | 120–0 |
| | 10% Com Sub B | 270 | 0.613 | 3A | 4.6 | 239.76 | 20.75 | 118 | 26.2 | 6 | 15 | 60 | 530–0 | 80–0 | 110–0 |
| DD | None | 110 | 1.020 | — | — | — | — | — | — | — | — | — | — | — | — |
| | 10% WESHSBA | 280 | 0.665 | 3B | 20.0 | 27.64 | 5.04 | 117 | 31.0 | 36 | 20 | 24 | 25–0 | 40–0 | 0–0 |
| | 10% WESHLSA | 280 | 0.670 | 3A | 21.2 | 32.02 | 5.73 | 135 | 31.1 | 13 | 7 | 60 | 100–0 | 20–0 | 95–0 |
| | 10% SSO | 300 | 0.697 | 1B | 12.9 | 27.78 | 5.05 | 122 | 31.4 | 12 | 2 | 66 | 250–0 | 20–0 | 80–0 |
| | 10% Com Sub A | 360 | 0.713 | 1B | 12.6 | 27.72 | 5.26 | 140 | 31.3 | 33 | 13 | 34 | 220–0 | 20–0 | 100–0 |
| | 10% Com sub B | 270 | 0.620 | 1B | 16.8 | 27.68 | 5.09 | 125 | 31.1 | 5 | 0 | 75 | 280–0 | 30–0 | 100–0 |
| "Topaz S105" | None | 120 | 0.794 | — | — | — | — | — | — | — | — | — | — | — | — |
| | 5% WESHSBA | 280 | 0.642 | | | | | | | | | | | | |
| | 10% WESHSBA | 280 | 0.675 | | | | | | | | | | | | |
| | 5% WESHLSA | 260 | 0.668 | | | | | | | | | | | | |
| | 10% WESHLSA | 280 | 0.553 | | | | | | | | | | | | |
| | 5% SSO | 230 | 0.558 | | | | | | | | | | | | |
| | 10% SSO | 300 | 0.623 | | | | | | | | | | | | |
| | 5% Com Sub A | 220 | 0.606 | | | | | | | | | | | | |
| | 10% Com Sub A | 320 | 0.500 | | | | | | | | | | | | |
| | 5% Com Sub B | 230 | 0.596 | | | | | | | | | | | | |
| | 10% Com Sub B | 280 | 0.670 | | | | | | | | | | | | |

[a] Base oils: AA, Southwest Research Institute's (SWRI) crankcase base oil; BB, SWRI transmission base fluid; CC, SWRI (RGO-100) gear lubricant; DD, Mayco's (100/100 vis) solvent extracted neutral oil; "Topaz S105", "Topaz S105" paraffin oil (similar to 102 paraffin oil).

[b] Sulfurized additives: WESHSBA, wax esters from selectively hydrogenated soybean acids; WESHLSA, wax esters from selectively hydrogenated linseed acids; SSO, sulfurized sperm whale oil; Com Sub A, commercial substitute A; Com Sub B, commercial substitute B.

[c] Copper strip corrosion test ASTM Method D 130-65; 1, slight tarnish; 2, medium tarnish; 3, dark tarnish; 4, corrosion; for each numerical value, B indicates slightly more corrosion than A.

[d] API = American Petroleum Institute.

[e] Foam test ASTM Method D 892, sequence of bubbling 5 minutes and settling 10 minutes; I, at 75° F.; II, at 200° F.; III, at 75° F. after collapsing the foam.

I claim:

1. A lubricant composition comprising a mixture of compounds having the structural formula:

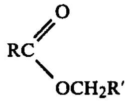

where both R and R' are radicals each independently selected from the group of:

(1) $CH_3(CH_2)_xCH{=}CH(CH_2)_z$—
where $x=1$-$4, y=1$-$4$, $z=7$-$8$, and $x+y+z=12$;

(2) $CH_3(CH_2)_xCH{=}CH(CH_2)_y$—
where $x=0$-$9$, $y=5$-$14$, and $x+y=14$.

(3) $CH_2{=}CH(CH_2)_{15}$—;

(4) $CH_3(CH_2)_{16}$—; and (5) $CH_3(CH_2)_{14}$—;

where the distribution of said R and R' radicals in said mixture of compounds includes from a trace to about 50 mole percent of radical (1), from about 35 to about 80 mole percent of radicals (2) and (3) combined, from about 3 to about 20 mole percent of radical (4), and from about 5 to about 15 mole percent of radical (5), and where said distribution of radicals in said mixture also contains from a trace to about 60 mole percent of isolated trans double bonds, from 0 to about 16 mole percent of conjugatable double bonds, and from a trace to about 45 mole percent of nonconjugatable double bonds.

2. A lubricant composition as described in claim 1 wherein said distribution of R and R' radicals includes about 9 mole percent of radical (1), about 75 mole percent of radicals (2) and (3) combined, about 5 mole percent of radical (4), and about 10 mole percent of radical (5), and wherein said distribution of radicals contains about 40 mole percent of isolated trans double bonds.

3. A lubricant composition as described in claim 1 wherein said distribution of R and R' radicals includes about 27 mole percent of radical (1), about 60 mole percent of radicals (2) and (3) combined, about 6 mole percent of radicals (2) and (3) combined, about 6 mole percent of radical (4), and about 7 mole percent of radical (5), and wherein said distribution of radicals also contains about 51 mole percent of isolated trans double bonds.

4. An extreme pressure and antiwear lubricant additive comprising the reaction product of elemental sulfur and a mixture of compounds having the structural formula:

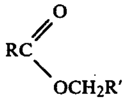

where both R and R' are radicals each independently selected from the group of:

(1) $CH_3(CH_2)_xCH{=}CH(CH_2)_yCH{=}CH(CH_2)_z$—
where $x=1$-$4$, $y=1$-$4$, $z=7$-$8$, and $x+y+z=12$;

(2) $CH_3(CH_2)_xCH{=}CH)CH_2)_y$—
where $x=0$-$9$, $y=5$-$14$, and $x+y=14$;

(3) $CH_2{=}(CH(CH_2)_{15}$—;

(4) $CH_3(CH_2)_{16}$—; and (5) $CH_3(CH_2)_{14}$—;

where the distribution of said R and R' radicals in said mixture of compounds includes from a trace to about 50 mole percent of radical (1), from about 35 to about 80 mole percent of radicals (2) and (3) combined, from about 3 to about 20 mole percent of radical (4), and from about 5 to about 15 mole percent of radical (5), and where said distribution of radicals in said mixture also contains from a trace to about 60 mole percent of isolated trans double bonds, from 0 to about 16 mole percent of conjugatable double bonds, and from a trace to about 45 mole percent of nonconjugatable double bonds.

5. An extreme pressure and antiwear lubricant additive as described in claim 4 wherein said distribution of R and R' radicals includes about 9 mole percent of radical (1), about 75 mole percent of radicals (2) and (3) combined, about 5 mole percent of radical (4), and about 10 mole percent of radical (5), and wherein said distribution of radicals also contains about 40 mole percent of isolated trans double bonds.

6. An extreme pressure and antiwear lubricant additive as described in claim 4 wherein said distribution of R and R' radicals includes about 27 mole percent of radical (1), about 60 mole percent of radicals (2) and (3) combined, about 6 mole percent of radical (4), and about 7 mole percent of radical (5), and wherein said distribution of radicals also contains about 51 mole percent of isolated trans double bonds.

7. A process for preparing a lubricant composition from a free fatty acid mixture obtained from selectively hydrogenated and saponified soybean or linseed triglyceride oils wherein said fatty acids are characterized by the structural formula:

$RCO_2H$ where R is a radical selected from the group of- (1) $CH_3(CH_2)_xCH{=}CH(CH_2)_yCH{=}CH(CH_2)_z$—
where $x=1$-$4$, $y=1$-$4$, $z=8$-$8$, and $x+y+z=12$;

(2) $CH_3(CH_2)_xCH{=}CH(CH_2)_y$—
where $x=0$-$9$, $y=5$-$14$, and $x+y=14$;

(3) $CH_2{=}(CH_2)_{15}$—;

(4) $CH_3(CH_2)_{16}$—; and (5) $CH_3(CH_2)_{14}$—;

where the distribution of said radicals in said fatty acid mixture includes from a trace to about 50 mole percent of radical (1), from about 35 to about 80 mole percent of radicals (2) and (3) combined, from about 3 to about 20 mole percent of radical (4), and from about 5 to about 15 mole percent of radical (5), and where said distribution of radicals in said mixture also contains from a trace to about 60 mole percent of isolated trans double bonds, from 0 to about 16 mole percent of conjugatable double bonds, and from a trace to about 45 mole percent of nonconjugatable double bonds; said process comprising the following steps:

(a) selectively reducing a first portion of said fatty acid mixture to substantially the corresponding alchols;

(b) esterifying a second portion of said fatty acid mixture with said alcohols obtained in step (a) in order to yield wax esters having the structural formula:

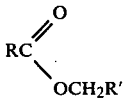

where both R and R′ are radicals independently selected from the group of radicals set forth above; and (c) recovering said wax esters for use as said lubricant composition.

8. The process as described in claim 7 wherein said free fatty acid mixture is obtained from selectively hydrogenated and saponified soybean oil.

9. The process as described in claim 7 wherein said free fatty acid mixture is obtained from selectively hydrogenated and saponified linseed oil.

* * * * *